(12) United States Patent
Harvey et al.

(10) Patent No.: US 7,921,230 B2
(45) Date of Patent: Apr. 5, 2011

(54) USB DEVICES PRE-CONFIGURATION FOR KVM SWITCH

(75) Inventors: John Paul Harvey, Round Rock, TX (US); Wei Kuo, Austin, TX (US); Dac D Nguyen, Cedar Park, TX (US); Robert Paul Stelzer, Austin, TX (US)

(73) Assignee: International Business Corporation, Armonk, NY (US)

( * ) Notice: Subject to any disclaimer, the term of this patent is extended or adjusted under 35 U.S.C. 154(b) by 255 days.

(21) Appl. No.: 12/206,192

(22) Filed: Sep. 8, 2008

(65) Prior Publication Data
US 2010/0064079 A1    Mar. 11, 2010

(51) Int. Cl.
*G06F 3/00* (2006.01)
(52) U.S. Cl. .............................. 710/8; 710/10; 713/100
(58) Field of Classification Search ......................... None
See application file for complete search history.

(56) References Cited

U.S. PATENT DOCUMENTS

| | | | |
|---|---|---|---|
| 6,041,364 A * | 3/2000 | Lortz et al. .................... 719/321 |
| 6,324,544 B1 * | 11/2001 | Alam et al. ............................ 1/1 |
| 6,650,228 B1 * | 11/2003 | Vacherand et al. ........ 340/10.33 |
| 6,915,362 B2 * | 7/2005 | Ramsey et al. ................. 710/62 |
| 7,139,861 B2 | 11/2006 | Lee |
| 7,281,067 B2 | 10/2007 | Chen |
| 2003/0212842 A1 | 11/2003 | Ferguson |
| 2004/0210430 A1 | 10/2004 | Ying et al. |
| 2006/0059287 A1 * | 3/2006 | Rivard et al. ................... 710/300 |
| 2006/0195637 A1 * | 8/2006 | Zhang et al. ..................... 710/72 |
| 2006/0195724 A1 * | 8/2006 | Filho ................................ 714/35 |
| 2007/0022480 A1 * | 1/2007 | Newman ......................... 726/24 |
| 2008/0005414 A1 | 1/2008 | Liu et al. |
| 2008/0168118 A1 * | 7/2008 | Hickey et al. ................. 709/201 |
| 2008/0276009 A1 * | 11/2008 | Mesa et al. ........................ 710/4 |
| 2009/0216519 A1 * | 8/2009 | Parthasarathy et al. ......... 703/24 |

\* cited by examiner

*Primary Examiner* — Henry W Tsai
*Assistant Examiner* — Michael Sun
(74) *Attorney, Agent, or Firm* — Yee & Associates, P.C.; David A. Mims, Jr.

(57) ABSTRACT

According to one embodiment of the present invention, the illustrative embodiments provide a computer implemented method, apparatus, and computer program product for configuring devices. Device information for a plurality of devices is retrieved from an object data manager. A determination is made as to whether a keyboard-video-mouse environment exists. If a keyboard-video-mouse environment does not exist, each device in a plurality of devices is configured to either an available state or a defined state. If a keyboard-video-mouse environment exists, each device in the plurality of devices is configured to the available state. A list of all enumerated devices is requested and a determination is made as to whether a particular device is in the list of enumerated devices. If the particular device is not in the list of enumerated devices, a pseudo device is added to the list to form a modified list of all enumerated devices.

19 Claims, 6 Drawing Sheets

Changes required by this feature are totally contained in the define_children() routine of the AIX USB System Driver configuration method "cfgusb".

After requesting and building a list of all enumerated USB devices the following logic will be added:
if boot phase
    if ibm,preconfigure-usb-kvm property present in the OpenFirmware tree
        if there is a graphics adapter in Available state
            if no keyboard is in list of enumerated devices
                add pseudo keyboard device to list
            if no mouse is in list of enumerated devices
                add pseudo mouse device to list The following logic will be added to the enumerate children routine (aka: routine that matches enumerate devices with CuDv instances):
if pseudo device
    if there is no CuDv instance for device type
        create pseudo CuDv instance (ie: connwhere and location fields set to '\0')
    else
        if pseudo CuDv instance found
            assign CuDv instance to device
else if real device
    assign CuDv instance to device
    save CuDv connwhere and location field
else
    if first pass and CuDv instance found in Available state
        assign CuDv instance to device
    if not first pass and CuDv instance found in Defined state
        assign CuDv instance to device
        set CuDv connwhere field to '\0'

*FIG. 9*

USB DEVICES PRE-CONFIGURATION FOR KVM SWITCH

BACKGROUND OF THE INVENTION

1. Field of the Invention

The present invention relates generally to a data processing system and in particular to a method and apparatus for a keyboard, video, mouse (KVM) switch. More particularly, the present invention is directed to a computer implemented method, apparatus, and computer usable program code for configuration of universal serial bus devices in a KVM environment.

2. Description of the Related Art

A keyboard, video, monitor (KVM) switch is a hardware device which allows a user to control an array of computers from a single set of monitor, keyboard, and mouse. Typically, the user connects a monitor, keyboard, and mouse to the KVM switch, then uses special cables, such as universal serial bus (USB) cables and video graphics array (VGA) cables, to connect the KVM switch to the computers. Control is switched from one computer to another by the use of controls on the KVM switch. The KVM switch passes the signals between the computers and the keyboard, mouse, and monitor depending on which computer is currently selected.

A server blade is a single circuit board populated with components that are usually found on multiple boards. These components include, for example, processors, memory, network connections, and other suitable components. Server blades are designed to slide into existing servers, but are typically more cost-efficient, smaller, and consume less power than traditional box-based servers. In one example, multiple server blades are placed in a single rack with a single keyboard, monitor, and mouse to connect to any server blade in the rack using a KVM device.

BRIEF SUMMARY OF THE INVENTION

According to one embodiment of the present invention, the illustrative embodiments provide a computer implemented method, apparatus, and computer program product for configuring devices. Device information for a plurality of devices is retrieved from an object data manager. A determination is made as to whether a keyboard-video-mouse environment exists. If a keyboard-video-mouse environment does not exist, each device in a plurality of devices is configured to either an available state or a defined state. If a keyboard-video-mouse environment exists, each device in the plurality of devices is configured to the available state. A list of all enumerated devices is requested and a determination is made as to whether a particular device is in the list of enumerated devices. If the particular device is not in the list of enumerated devices, a pseudo device is added to the list to form a modified list of all enumerated devices.

BRIEF DESCRIPTION OF THE SEVERAL VIEWS OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any tangible apparatus that can contain, store, communicate, propagate, or transport the program for use by or in connection with the instruction execution system, apparatus, or device. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
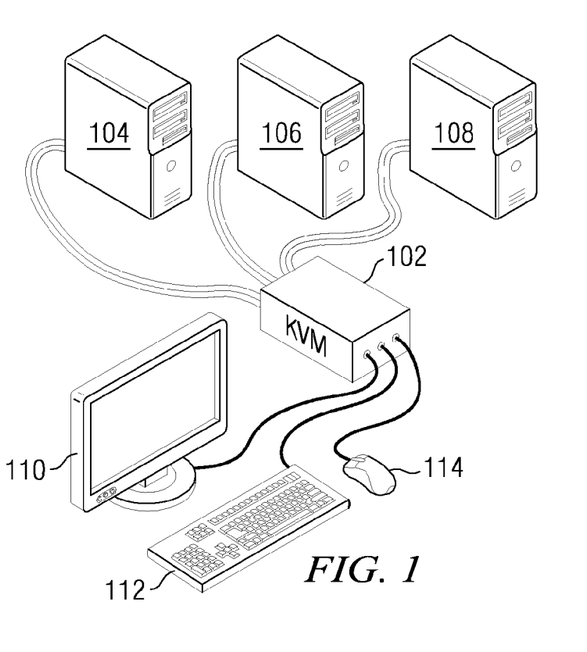
FIG. 1 is a block diagram of a data processing system in which the illustrative embodiments may be implemented.
Figure 2:
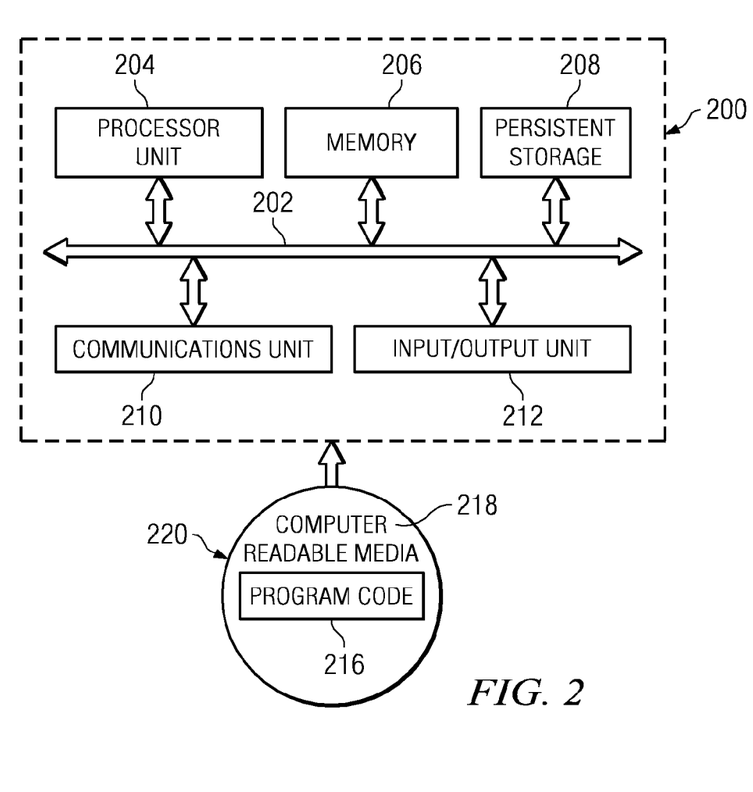
FIG. 2 is a block diagram of a data processing system in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a block diagram of a data processing system in which the illustrative embodiments may be implemented. In this illustrative example, data processing system 100 includes KVM switch 102, which is connected to computer 104, computer 106, computer 108, monitor 110, keyboard 112, and mouse 114. KVM switch 102 is a hardware device that allows a user to control multiple computers from a single keyboard, video monitor, and mouse. KVM switch 102 allows monitor 110, keyboard 112, and mouse 114 to control any one of computers 104, 106, and 108 at a given time. In an illustrative embodiment, control is switched from computer 104 to computer 106 by the use of a switch or buttons on KVM switch 102. KVM switch 102 passes the signals between any one of computers 104, 106, and 108, and monitor 110, keyboard 112, and mouse 114 depending on which computer is currently selected. In another illustrative embodiment, control is switched through keyboard commands executed on keyboard 112.

FIG. 2 is a block diagram of a data processing system in accordance with an illustrative embodiment. Data processing system 200 is an example of a computer, such as computer 104 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, and input/output (I/O) unit 212.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse, such as keyboard 112 and mouse 114 in FIG. 1. Further, input/output unit 212 may send output to a monitor, such as monitor 110 in FIG. 1.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The illustrative embodiments recognize a need for a pre-configuration system that allows a computer system to recognize a KVM environment and correctly configure the USB devices during boot even if the USB devices are not detected during the boot process.

The embodiments recognize that although current methods allow for the selected computer in a KVM environment to detect USB devices during the boot process, unselected computers in a KVM environment that boot or reboot in an unselected state will either fail to boot or boot with an unwanted configuration.

Therefore, the illustrative embodiments provide a computer implemented method, apparatus, and computer program product for configuring devices. Device information for a plurality of devices is retrieved from an object data manager. A determination is made as to whether a KVM environment exists. If a KVM environment exists, each device in the plurality of devices is configured to an available state.

Figure 3:
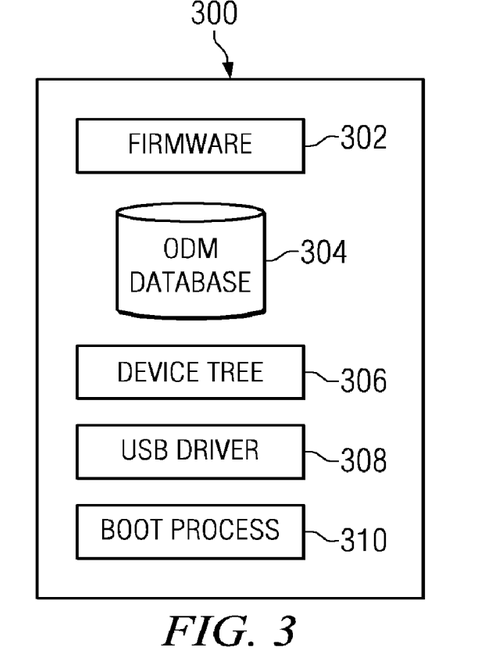
FIG. 3 is a block diagram of a computer system in accordance with an illustrative embodiment.

With reference now to FIG. 3, a block diagram of a computer system is depicted in accordance with an illustrative embodiment. Computer 300 may be implemented as any type of computing device, such as, without limitation, computer 104 in FIG. 1 or any other computing device depicted in FIG. 1 and FIG. 2. Computer 300 includes firmware 302, object data manager (ODM) database 304, device tree 306, universal serial bus (USB) driver 308, and boot process 310.

Firmware 302 is the programmable content of computer 300. In an illustrative embodiment, firmware 302 is any type of computer program embedded in computer 300. Firmware 302 may be stored in a flash ROM registry of computer 300, such as memory 206 in FIG. 2. Firmware 302 may also be stored in the flash ROM registry of a device, such as monitor 110, keyboard 112, and mouse 114 in FIG. 1.

Object data manager database 304 is an illustrative example of a database containing system information and device configuration information. Information being managed by object data manager database 304 is stored and maintained as objects with associated attributes. Device tree 306 is a record of the devices currently loaded, based on the configuration information created by the firmware 302.

In an illustrative example, device tree 306 is created by firmware 302 and stored in memory, such as, but not limited to, memory 206 in FIG. 2, each time computer 300 is started, or whenever a dynamic change occurs to the system configuration of computer 300. In an illustrative embodiment, each branch in device tree 306 defines a device node with requirements for system configuration, such as, for example and without limitation, device identification (ID), a list of required resources, and a list of allocated resources. A list of required resources may also include details of interrupt requests, memory range, and resource types.

Universal serial bus (USB) driver 308 is a software program that controls a universal serial bus device. Every device, such as monitor 110, keyboard 112, and mouse 114 in FIG. 1, must have a driver, such as universal serial bus driver 308. A driver acts like a translator between the device and programs that use the device. Each device has its own set of specialized commands that only its driver knows. In contrast, most programs access devices by using generic commands. The driver, therefore, accepts generic commands from a program and then translates them into specialized commands for the device.

Boot process 310 is a process of loading the software that starts computer 300. Boot process 310 may be executed as a cold boot or a warm boot. A cold boot is starting computer 300 from the off position. A warm boot is restarting, or rebooting, computer 300 from the on position.

Firmware 302 builds device tree 306 by walking the bus and probing each slot in the bus to obtain the device information. During boot process 310, universal serial bus driver 308 reads object data manger database 304 and device tree 306 in order to properly configure devices connected to computer 300.

Figure 4:
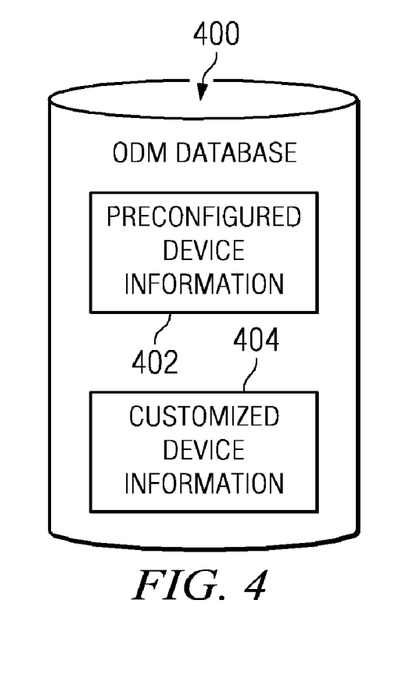
FIG. 4 is a block diagram of an object data manager database in accordance with an illustrative embodiment.

FIG. 4 is a block diagram of an object data manager database in accordance with an illustrative embodiment. Object data manager database 400 is an example of object data manager database 304 in computer 300 in FIG. 3. Object data manager database 400 is an illustrative example of a database containing system and device configuration information. Information being managed by object data manager database 400 is stored and maintained as objects with associated attributes.

Object data manager database 400 includes preconfigured device information 402 and customized device information 404. Customized device information 404 may indicate a device is in the available state or the defined state. A defined device is a device that is not available to a first computing device because the device is currently connected to a second computing device. For example, in an illustrative embodiment, a defined device may be keyboard 112 in FIG. 1. Keyboard 112 may not be available to a given computer, such as computer 104 in FIG. 1, because keyboard 112 is currently connected to another computer, such as computer 106 in FIG. 1. In this illustrative embodiment, keyboard 112 is in the defined state for computer 104 because keyboard 112 is unavailable to computer 104 and is currently connected to computer 106. A device in the available state is a device that is currently connected to a first computing system, and is available to the first computing system. For example, in the illustrative embodiment above, keyboard 112 in FIG. 1, which is currently connected to computer 106 in FIG. 1, is in the available state for computer 106 because keyboard 112 is currently connected to computer 106 and available to computer 106.

Preconfigured device information 402 may indicate a device is preconfigured. A preconfigured device is a device, which is not currently connected to a first computing system, but is configured as available to the first computing system during a boot process. For example, using the same illustrative embodiment above, keyboard 112 in FIG. 1, which is not available to computer 104 because keyboard 112 is not currently connected to computer 104, is configured to an available state during the boot process of computer 104 even though keyboard 112 is not currently connected to computer 104. A preconfigured device may also be referred to as a pseudo device.

In another illustrative embodiment, mouse 114 in FIG. 1 is a device that is connected to computer 108. Mouse 114 is in the available state for computer 108 because mouse 114 is connected to and available to computer 108. Mouse 114 may be a preconfigured device to computers 104 and 106 because mouse 114 is neither connected to nor available to computers 104 and 106. However, if computer 104, for example, configured mouse 114 as available during the boot process of computer 104, despite the fact that mouse 114 was not currently connected to computer 104 during the boot process, then mouse 114 is a preconfigured device to computer 104.

Preconfigured device information 402 contains dummy device information or pseudo device information, created by and accessible to a universal serial bus system driver, such as universal serial bus driver 308 in FIG. 3. The pseudo device information provides configuration information for a pseudo device that allows the device driver, such as universal serial bus driver 308 in FIG. 3, to configure the pseudo device during the boot process as if the pseudo device were actually connected to the computer, such as computer 300 in FIG. 3, at that instance in time. Configuration information includes connwhere strings and location fields for the pseudo device. The location field consists of the host controller's instance number followed by a list of hub ports that must be traversed to reach the logical device. The connwhere string represents the address of the logical universal serial bus device. The address consists of four fields separated by periods. The first field contains the instance number of the host controller to which the device is attached, the second field contains the address assigned to the device by the universal serial bus system driver, the third field contains the configuration index (always 1), and the last field contains the universal serial bus interface index. For universal serial bus pseudo devices, the connwhere strings and location fields will be set to null.

Customized device information 404 for a device in the available state contains real device information accessible to a device driver, such as universal serial bus driver 308 in FIG. 3. The real device information provides configuration information, including connwhere strings and location fields, for a real device. A real device is a device that is connected to and available to a computer, such as computer 104 in FIG. 1. Customized device information 404 allows the device driver to configure a real device during the boot process.

Customized device information 404 for a device in the defined state contains information on the devices that are accessible to a computer, such as computer 104 in FIG. 1, but not available to the computer.

Figure 5:
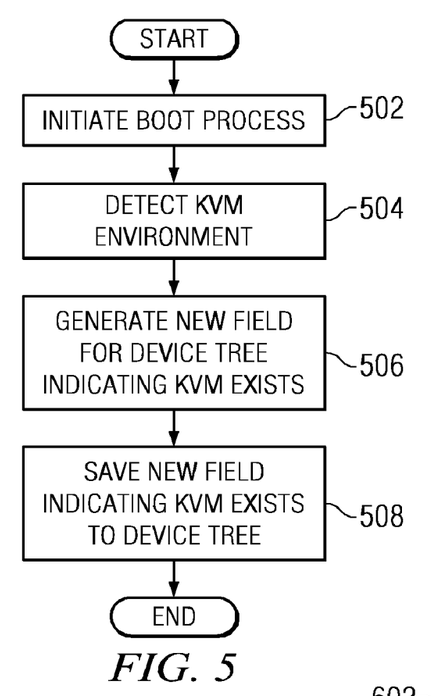
FIG. 5 is a flowchart illustrating an exemplary process for indicating that a KVM environment exists in accordance with an illustrative embodiment.

FIG. 5 is a flowchart illustrating an exemplary process for indicating that a KVM environment exists in accordance with an illustrative embodiment. The process in FIG. 5 is implemented by software, such as firmware 302 in FIG. 3.

The process begins by initiating a boot process (step 502) for a computer. A boot process may be, for example, a cold boot of the computer from the off position or a warm boot of the computer from the on position. A warm boot may also be referred to as a reboot of the computer system. Next, the process detects a KVM environment (step 504) and generates a new field for a device tree indicating a KVM environment exists (step 506). The device tree is part of a computer system, such as device tree 306 in computer 300 in FIG. 3. The device tree is a record of the devices currently loaded, based on the configuration information stored in a flash ROM registry, such as firmware 302 in FIG. 3. Each branch in the device tree defines a device node with requirements for system configuration. Finally, the process saves the new field indicating a KVM environment exists to the device tree (step 508), with the process terminating thereafter.

Figure 6:
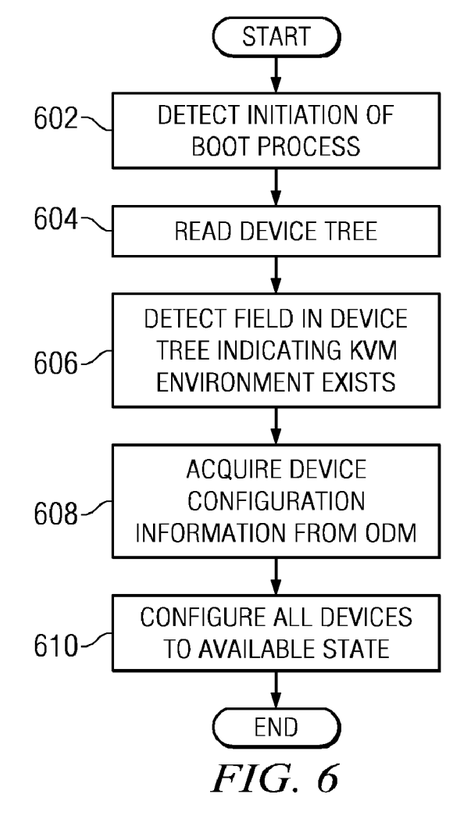
FIG. 6 is a flowchart illustrating an exemplary process for configuring universal serial bus devices in a KVM environment.

FIG. 6 is a flowchart illustrating an exemplary process for configuring universal serial bus devices in a KVM environment. The process in FIG. 6 is implemented by software, such as universal serial bus driver 308 in FIG. 3.

The process begins by detecting initiation of a boot process (step 602). The process reads the device tree (step 604) and detects a file in the device tree indicating a KVM environment exists (step 606). Next, the process acquires device configuration information from the object data manger (step 608), such as object data manager database 304 in FIG. 3. The process then configures all devices to an available state (step 610), with the process terminating thereafter.

Because the KVM environment was detected, the universal serial bus driver uses information, such as customized device information 404 in FIG. 4, to configure the keyboard and mouse to an available state. As a result, even though the keyboard and mouse may not be listed in the device tree during the boot process; all devices are configured as if they were connected so that when the devices are actually switched to connect with the computer in a KVM environment, the proper configuration is in place.

Figure 7:
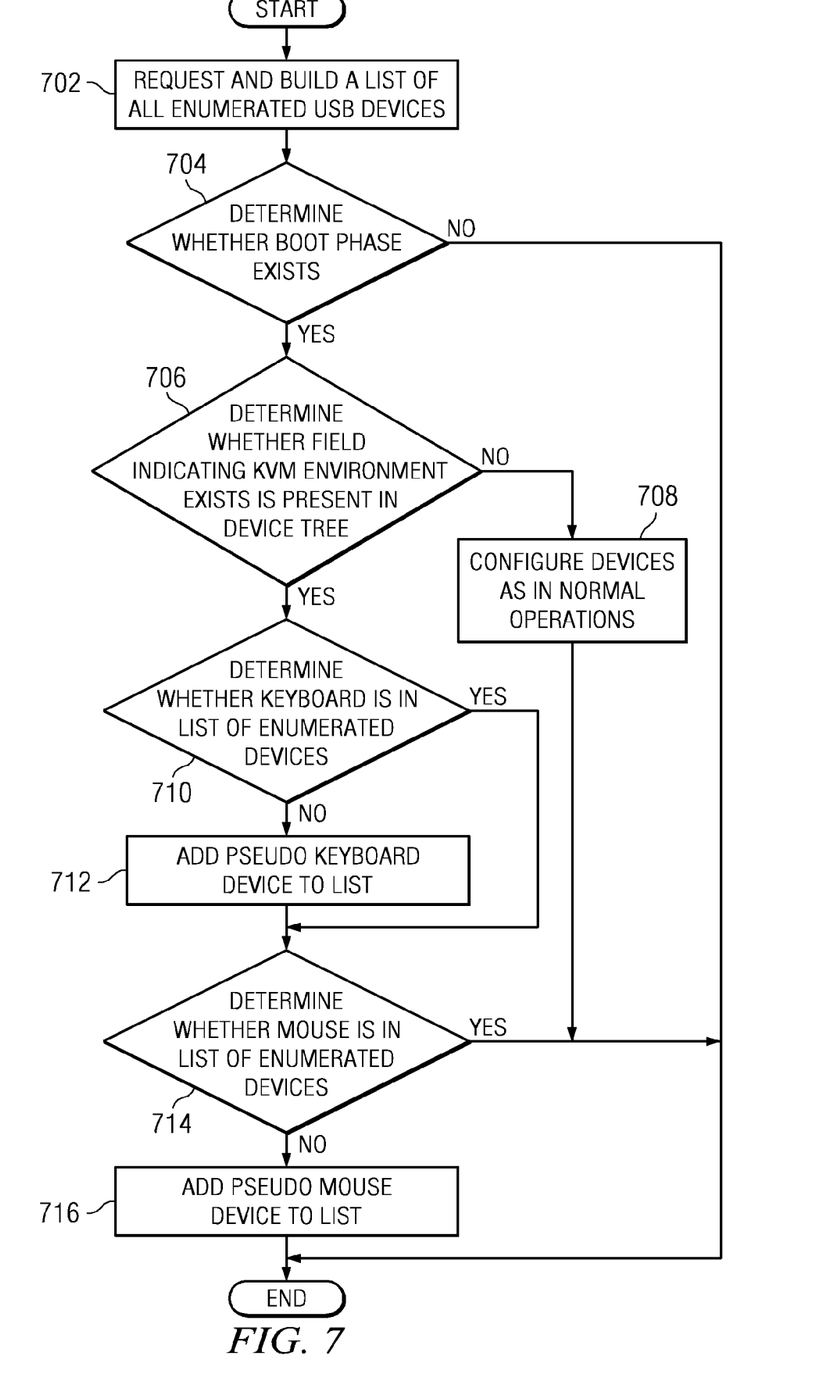
FIG. 7 is a flowchart further illustrating an exemplary process for configuring universal serial bus devices in a KVM environment.

FIG. 7 is a flowchart further illustrating an exemplary process for configuring universal serial bus devices in a KVM environment. The process in FIG. 7 may be implemented by software, such as universal serial bus driver 308 in FIG. 3.

The process begins by requesting and building a list of all enumerated universal serial bus devices (step 702). An enumerated device is a device found during configuration. The list of enumerated devices is temporary and is working information used during configuration. Next, the process determines whether a boot phase exists (step 704). If a boot phase does not exist, the process terminates. If a boot phase does exist, the process next determines whether a field indicating a KVM environment exists is present in the device tree (step 706). If a KVM environment does not exist, the process then configures devices as in normal operation (step 708), with the process terminating thereafter. A normal configuration operation detects which devices are connected to the computer, and configures those devices as available, while configuring any other device not listed in a device tree, or not connected to the computer during the boot process as unavailable or defined.

If the KVM environment does exist, the process then determines whether a keyboard is in the list of enumerated devices (step 710). If the keyboard is not in the list of enumerated devices, the process adds a pseudo keyboard device to the list (step 712). If the keyboard is in the list of enumerated devices, or after adding a pseudo keyboard device to the list (step 712), the process then determines whether a mouse is in the list of enumerated devices (step 714). If a mouse is in the list of enumerated devices, the process terminates. If a mouse is not in the list of enumerated devices, the process then adds a pseudo mouse device to the list (step 716), with the process terminating thereafter.

Figure 8:
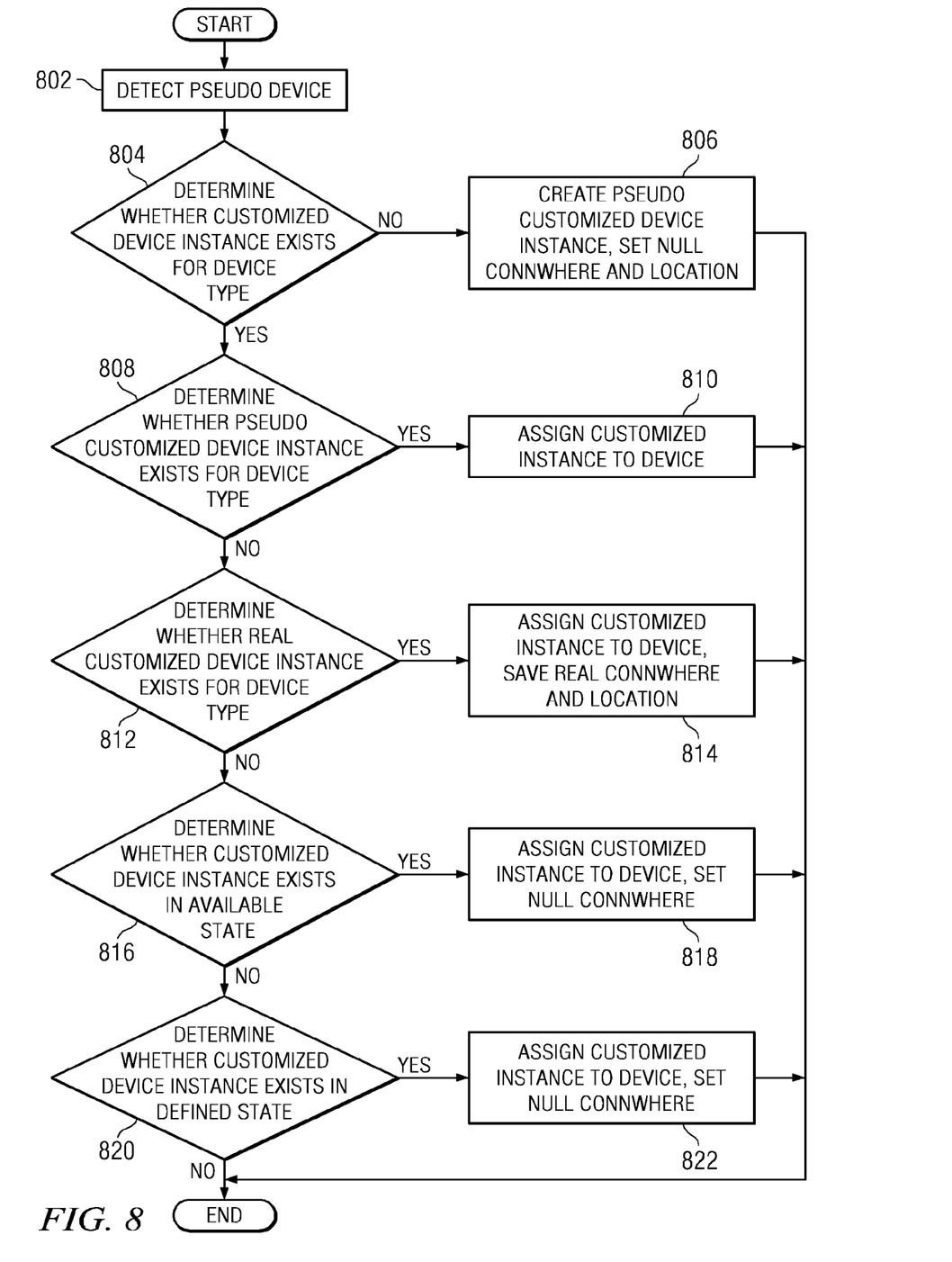
FIG. 8 is a flowchart illustrating an exemplary process for configuring universal serial bus devices in a KVM environment to an available state.

FIG. 8 is a flowchart illustrating an exemplary process for configuring universal serial bus devices in a KVM environment to an available state. The process in FIG. 8 may be implemented by software, such as universal serial bus driver 308 in FIG. 3.

The process begins by detecting a pseudo device (step 802). If a device in the list of enumerated devices is detected with a null value of connwhere string or location field, the device is a pseudo device. If a device in the customized device object data manger database is detected with a null value of connwhere string or location field then the device is a configured pseudo device. The process determines whether a customized device instance exists for the device type (step 804) of the pseudo device in the customized device object data manager database. Each device instance, distinguished by a unique logic name, is represented by an object in the customized device object data manager database. If the device was previously configured, a customized device instance exists in the object data manager database. If a customized device instance does not exist, the process creates a pseudo customized device instance in the device object data manager database with a null value of connwhere string and location field (step 806). With the device instance being set or created, the device is now in the available state.

If a customized device instance exists, the process then determines whether the instance is a pseudo device (step 808). If the instance is a pseudo device (i.e. both the value of the connwhere string and the location field in the customized device object data manger database are null) then the process assigns the instance to the device (step 810). If the instance is not a pseudo device the process then determines whether the instance is a real device (step 812). A real device means that the device has been opened and connected and has a unique value for the connwhere string and the location field in the customized device object data manager database. If the instance is a real device the process then assigns the instance to the device and saves the real connwhere string and location field to the device in the list of enumerated devices (step 814). If the instance is not a real device the process then determines whether the instance is in the available state (step 816). An instance in the available state means that the device has been moved after open. If the instance is in the available state the process then assigns the instance to the device and sets the value of the connwhere string in the customized device object data manager database to null (step 818). If the instance is not in the available state the process then determines whether the instance is in the defined state (step 820). An instance in the defined state means that the device has been configured but has not yet been opened. If the instance is not in the defined state, the process terminates. If the instance is in the defined state the process then assigns the instance to the device and sets the value of the connwhere string in the customized device object data manager database to null (step 822), with the process terminating thereafter. With the best matched instance being assigned to the device, the device is now in the available state.

Figure 9:
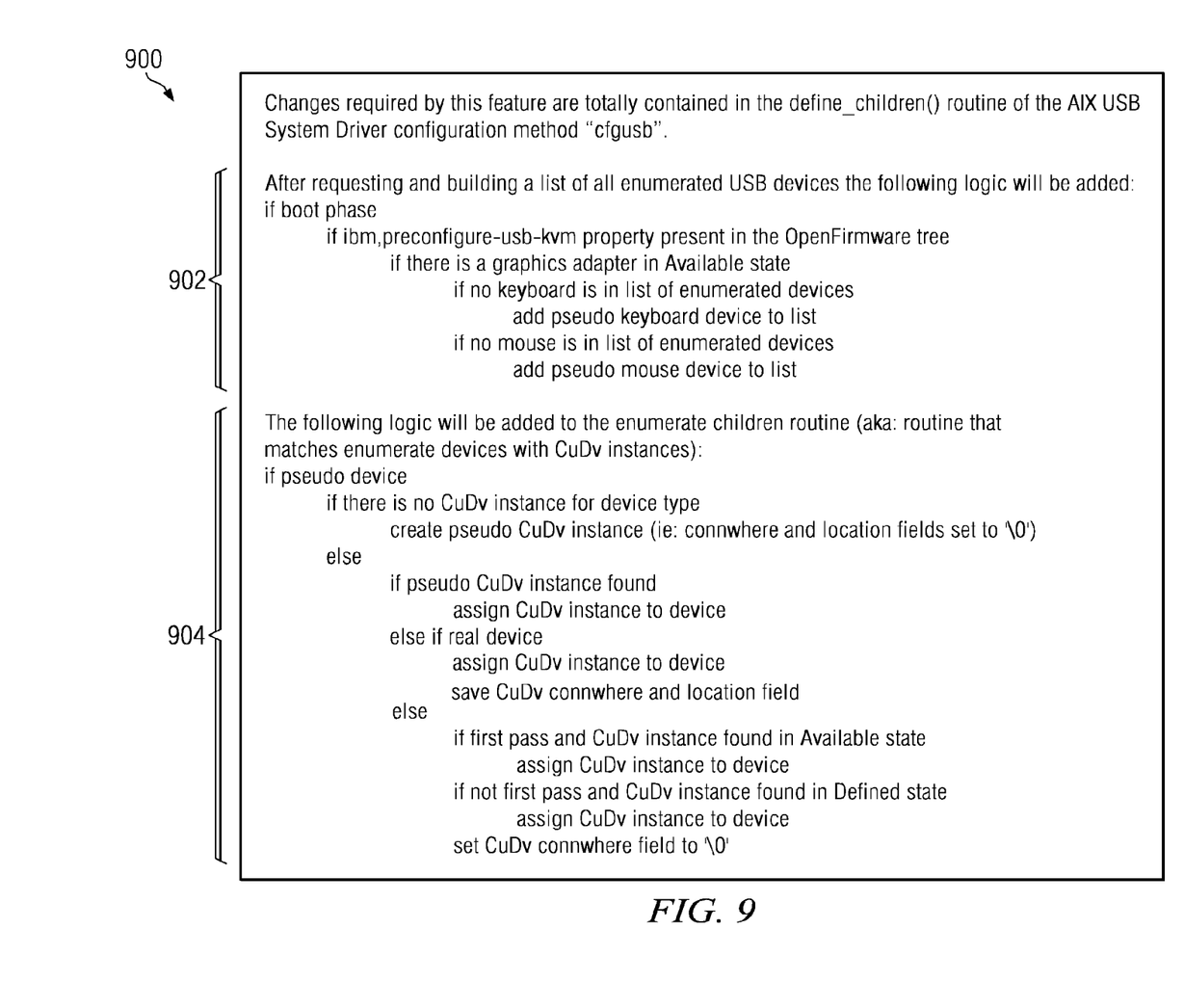
FIG. 9 is an exemplary illustration of logic for configuring universal serial bus devices in a KVM environment in accordance with an illustrative embodiment.

FIG. 9 is an exemplary illustration of logic for configuring universal serial bus devices in a KVM environment in accordance with an illustrative embodiment. Logic 900 in FIG. 9 may be implemented by software, such as universal serial bus driver 308 in FIG. 3.

Logic 900 contains logic section 902 and logic section 904. Logic section 902 illustrates a process for adding pseudo devices to a modified list of enumerated devices when a particular device is not found in the original list of enumerated devices. For example, if mouse 114 in FIG. 1 is not found on a list of enumerated devices, logic section 902 adds a pseudo mouse to the list to form a modified list of enumerated devices. Logic section 904 illustrates a process for matching enumerated devices with customized device instances.

In an illustrative embodiment, when a device is being configured, the object data manager database data will be retrieved to create the customized device instance. The device is not yet usable and is in the defined state. Logic 900 allows for the device driver to be loaded to the kernel, placing the device in an available state.

The illustrative embodiments recognize a need for a pre-configuration system that allows a computer system to recognize a KVM environment and correctly configure the USB devices during boot even if the USB devices are not detected during the boot process.

The embodiments recognize that although current methods allow for the selected computer in a KVM environment to detect USB devices during the boot process, unselected computers in a KVM environment that boot or reboot in an unselected state will either fail to boot or boot with an unwanted configuration.

Therefore, the illustrative embodiments provide a computer implemented method, apparatus, and computer program product for configuring devices. Device information for a plurality of devices is retrieved from an object data manager. A determination is made as to whether a KVM environment exists. If a KVM environment exists, each device in the plurality of device is configured to an available state.

When devices in a KVM environment are configured to an available state regardless of whether or not they are currently connected to a computing system, the individual computing systems in the KVM environment can boot or reboot at any time with correct device configuration. One advantage is that a computing system that is not currently selected by a KVM switch can reboot with the correct device configuration information and be correctly configured to receive signals from the plurality of devices when the KVM switch later selects the computing device. In the prior art, to solve this issue, the KVM needs to send signals to simulate the keyboard and mouse to computers not currently being selected. This requires constant communication between the KVM and computers. Since signals for keyboard and mouse are handled in the interrupt level, the constant singling will impact the computer performance significantly.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The computer-readable storage medium can be an electronic, magnetic, optical, electromagnetic, infrared, or semiconductor system, apparatus, or device. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk— read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for configuring devices, the computer implemented method comprising:
   retrieving device information for a plurality of devices from an object data manager;
   determining whether a keyboard-video-mouse environment exists; and
   responsive to determining the keyboard-video-mouse environment exists, configuring each device in the plurality of devices to the available state, wherein the step of configuring each device in the plurality of devices to the available state further comprises:
   requesting a list of all enumerated devices, wherein the list of all enumerated devices consists of all real devices;
   determining whether a first device in the plurality of devices is in the list of all enumerated devices;
   responsive to the first device in the plurality of devices not being in the list of all enumerated devices, adding a pseudo first device to the list of all enumerated devices to form a modified list of all enumerated devices;
   determining whether a second device in the plurality of devices is in the modified list of all enumerated devices;
   responsive to the second device in the plurality of devices not being in the modified list of all enumerated devices, adding a second pseudo device to the modified list of all enumerated devices; and
   generating a customized device connwhere string and a customized device location field for each device in the modified list of enumerated devices.

2. The computer implemented method of claim 1, wherein the step of determining whether the keyboard-video-mouse environment exists further comprises:
   reading a device tree; and
   identifying a field in the device tree indicating the keyboard-video-mouse environment exists.

3. The computer implemented method of claim 2, wherein the device tree is created by platform firmware, and wherein the platform firmware detects the keyboard-video-mouse environment and adds a new field to the device tree indicating the keyboard-video-mouse environment exists.

4. The computer implemented method of claim 1, further comprising:
responsive to determining the keyboard-video-mouse environment does not exist, configuring each device in the plurality of devices to one of an available state or a defined state, wherein the available state indicates an available device, and wherein the defined state indicates an unavailable device.

5. The computer implemented method of claim 1, wherein the step of generating the customized device connwhere string further comprises:
determining whether the each device in the modified list of enumerated devices is a real device or a pseudo device;
responsive to the each device being the real device, generating a real connwhere string; and
responsive to the each device being the pseudo device, generating a null connwhere string.

6. The computer implemented method of claim 1, wherein the step of generating the customized device location field further comprises:
determining whether the each device in the modified list of enumerated devices is a real device or a pseudo device;
responsive to the each device being the real device, generating a real location field; and
responsive to the each device being the pseudo device, generating a null location field.

7. The computer implemented method of claim 1, wherein the customized device connwhere string and the customized device location field are updated with real information when the real device is connected.

8. The computer implemented method of claim 7, wherein the customized device connwhere string is set to null and the customized device location field is not changed when the real device is disconnected after previously being connected.

9. A computer program product in a computer readable storage medium for configuring devices, the computer program product comprising:
instructions for retrieving device information for a plurality of devices from an object data manager;
instructions for determining whether a keyboard-video-mouse environment exists; and
responsive to determining the keyboard-video-mouse environment exists, instructions for configuring each device in the plurality of devices to the available state, wherein the instructions for configuring each device in the plurality of devices to the available state further comprises:
instructions for requesting a list of all enumerated devices, wherein the list of all enumerated devices consists of all real devices;
instructions for determining whether a first device in the plurality of devices is in the list of all enumerated devices;
responsive to the first device in the plurality of devices not being in the list of all enumerated devices, instructions for adding a pseudo first device to the list of all enumerated devices to form a modified list of all enumerated devices;
instructions for determining whether a second device in the plurality of devices is in the modified list of all enumerated devices;
responsive to the second device in the plurality of devices not being in the modified list of all enumerated devices, instructions for adding a second pseudo device to the modified list of all enumerated devices; and
instructions for generating a customized device connwhere string and a customized device location field for each device in the modified list of enumerated devices.

10. The computer program product of claim 9, wherein the instructions for determining whether the keyboard-video-mouse environment exists further comprises:
instructions for reading a device tree; and
instructions for identifying a field in the device tree indicating the keyboard-video-mouse environment exists.

11. The computer program product of claim 10, wherein the device tree is created by platform firmware, and wherein the platform firmware detects the keyboard-video-mouse environment and adds a new field to the device tree indicating the keyboard-video-mouse environment exists.

12. The computer program product of claim 9, further comprising:
responsive to determining the keyboard-video-mouse environment does not exist, instructions for configuring each device in the plurality of devices to one of an available state or a defined state, wherein the available state indicates an available device, and wherein the defined state indicates an unavailable device.

13. The computer program product of claim 9, wherein the instructions for generating the customized device connwhere string further comprises:
instructions for determining whether the each device in the modified list of enumerated devices is a real device or a pseudo device;
responsive to the each device being the real device, instructions for generating a real connwhere string; and
responsive to the each device being the pseudo device, instructions for generating a null connwhere string.

14. The computer program product of claim 9, wherein the instructions for generating the customized device location field further comprises:
instructions for determining whether the each device in the modified list of enumerated devices is a real device or a pseudo device;
responsive to the each device being the real device, instructions for generating a real location field; and
responsive to the each device being the pseudo device, instructions for generating a null location field.

15. The computer program product of claim 9, wherein the customized device connwhere string and the customized device location field are updated with real information when the real device is connected.

16. The computer program product of claim 15, wherein the customized device connwhere string is set to null and the customized device location field is not changed when the real device is disconnected after previously being connected.

17. An apparatus for configuring devices in a keyboard-video-mouse environment, the apparatus comprising:
a keyboard-video-mouse switch;
a first computer;
a second computer;
a keyboard;
a monitor;
a mouse; and
a device driver, wherein the device driver retrieves device information for a plurality of devices from a device tree; determines whether a keyboard-video-mouse environment exists; responsive to determining the keyboard-video-mouse environment exists, configures each device in the plurality of devices to the available state, wherein the device driver configures each device in the plurality of devices to the available state and further requests a list of all enumerated devices, wherein the list of all enumerated devices consists of all real devices; determines whether a first device in the plurality of devices is in the list of all enumerated devices; responsive to the first device in the plurality of devices not being in the list of all enumerated devices, adds a pseudo first device to the list of all enumerated devices to form a modified list of all enumerated devices; determines whether a second device in the plurality of devices is in the modified list of all enumerated devices; responsive to the second device in the plurality of devices not being in the modified list of all enumerated devices, adds a second pseudo device to the modified list of all enumerated devices; and generates a customized device connwhere string and a customized device location field for each device in the modified list of enumerated devices.

18. The apparatus of claim 17, wherein the device driver further determines whether the each device in the modified list of enumerated devices is a real device or a pseudo device; responsive to the each device being the real device, generates a real connwhere string; responsive to the each device being the pseudo device, generates a null connwhere string; and wherein the device driver generates the customized device location field and further determines whether the each device in the modified list of enumerated devices is a real device or a pseudo device; responsive to the each device being the real device, generates a real location field; and responsive to the each device being the pseudo device, generates a null location field.

19. The apparatus of claim 17, wherein the device driver further configures, responsive to determining the keyboard-video-mouse environment does not exist, each device in the plurality of devices to one of an available state or a defined state, wherein the available state indicates an available device, and wherein the defined state indicates an unavailable device.

* * * * *